United States Patent
Westnedge et al.

(10) Patent No.: US 10,471,988 B2
(45) Date of Patent: Nov. 12, 2019

(54) STEERING CENTERING/DAMPING MECHANISM FOR A STEERABLE HEAVY-DUTY VEHICLE AXLE/SUSPENSION SYSTEM

(71) Applicant: Hendrickson USA, L.L.C., Itasca, IL (US)

(72) Inventors: Andrew J. Westnedge, Granville, OH (US); James A. Guntermann, Columbus, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 119 days.

(21) Appl. No.: 15/724,330

(22) Filed: Oct. 4, 2017

(65) Prior Publication Data
US 2018/0093544 A1     Apr. 5, 2018

Related U.S. Application Data

(60) Provisional application No. 62/403,863, filed on Oct. 4, 2016.

(51) Int. Cl.
*B62D 7/22*    (2006.01)
(52) U.S. Cl.
CPC ........ *B62D 7/228* (2013.01); *B60G 2300/026* (2013.01); *B60G 2500/40* (2013.01)
(58) Field of Classification Search
CPC ..... B62D 7/22; B62D 7/228; B60G 2200/445
USPC .................................................. 280/89.11
See application file for complete search history.

(56) References Cited

U.S. PATENT DOCUMENTS

| | | | | |
|---|---|---|---|---|
| 1,223,913 A | * | 4/1917 | Weaver | B62D 7/22 280/89.12 |
| 1,238,135 A | * | 8/1917 | Griffeth | B62D 7/22 280/89.12 |
| 1,317,017 A | * | 9/1919 | Griffeth | B62D 7/22 280/89.12 |

(Continued)

FOREIGN PATENT DOCUMENTS

| | | |
|---|---|---|
| DE | 19716150 A1 | 10/1998 |
| EP | 0313962 A1 | 5/1989 |
| FR | 2335359 A1 | 7/1977 |

*Primary Examiner* — Ruth Ilan
(74) *Attorney, Agent, or Firm* — Dureska & Moore, LLC; David P. Dureska; Brent L. Moore (57) ABSTRACT

A steering centering/damping mechanism for a steerable heavy-duty vehicle axle/suspension system which includes a mechanically operated structure that provides a positive steering centering force to the axle/suspension system at a zero steer angle. The mechanically operated structure of the steering centering/damping mechanism also provides a positive steering centering force that increases in intensity as the steer angle of the axle/suspension system increases. In an embodiment of the steering centering/damping mechanism, the mechanically operated structure is a flat spring integrated into one or more steering assemblies of the axle/suspension system. The flat spring is in a pre-loaded condition at a zero steer angle to provide the positive steering centering force to the axle/suspension system at the zero steer angle, and is increasingly elastically deformed with increasing steer angles to provide the positive steering centering force which increases in intensity as the steer angle of the axle/suspension system increases.

9 Claims, 7 Drawing Sheets

(56) References Cited

U.S. PATENT DOCUMENTS

| | | | | |
|---|---|---|---|---|
| 1,317,912 A * | 10/1919 | Dyer | | B62D 7/22 280/89.1 |
| 1,378,542 A * | 5/1921 | Huffman | | B62D 7/22 280/89.11 |
| 1,403,019 A * | 1/1922 | Edman | | B62D 7/22 403/120 |
| 1,424,577 A * | 8/1922 | Martin | | B62D 7/22 280/93.502 |
| 1,435,423 A * | 11/1922 | Shomaker | | B62D 7/22 280/89.11 |
| 1,482,286 A * | 1/1924 | Colley | | B62D 7/22 280/93.511 |
| 1,612,840 A * | 1/1927 | Thomason | | B62D 7/22 280/89.12 |
| 1,636,588 A * | 7/1927 | Cavanagh | | B62D 7/22 192/84.1 |
| 1,654,217 A * | 12/1927 | Hill | | B62D 7/22 188/205 A |
| 1,729,655 A * | 10/1929 | Timms | | B62D 7/22 280/89 |
| 1,748,866 A * | 2/1930 | Colley | | B62D 7/22 280/89 |
| 1,760,935 A * | 6/1930 | Burdette | | B62D 7/22 280/89 |
| 1,791,972 A * | 2/1931 | Perkins | | B62D 7/22 280/89.12 |
| 2,242,593 A * | 5/1941 | Olson | | B62D 7/22 267/155 |
| 3,354,982 A | 11/1967 | Schramm | | |
| 3,823,957 A * | 7/1974 | Bishop | | B60G 3/00 280/124.141 |
| 3,848,885 A * | 11/1974 | Hefren | | B62D 7/22 267/150 |
| 3,880,439 A | 4/1975 | Wolter | | |
| 4,084,833 A | 4/1978 | Mohrbacker et al. | | |
| 4,181,318 A * | 1/1980 | Applegate | | B62D 7/22 267/150 |
| 4,213,626 A * | 7/1980 | Moore | | B62D 7/22 280/124.17 |
| 4,353,568 A * | 10/1982 | Boyce | | B62D 7/22 280/268 |
| 4,373,738 A | 2/1983 | Lange | | |
| 4,697,817 A * | 10/1987 | Jefferson | | B62D 7/22 267/150 |
| 4,708,354 A * | 11/1987 | Moore | | B62D 7/22 267/150 |
| 4,856,804 A | 8/1989 | Nash | | |
| 4,925,165 A | 5/1990 | Sketo | | |
| 5,000,716 A * | 3/1991 | Canavesi | | A63H 17/36 280/89.11 |
| 5,269,546 A | 12/1993 | Pollock et al. | | |
| 5,620,194 A | 4/1997 | Keeler et al. | | |
| 6,530,585 B1 | 3/2003 | Howard | | |
| 7,131,652 B2 | 11/2006 | Ramsey | | |
| 7,360,773 B2 * | 4/2008 | Gottschalk | | B60G 9/003 188/290 |
| 7,748,724 B2 | 7/2010 | Gottschalk | | |
| 8,616,565 B1 * | 12/2013 | Delorenzis | | B62D 7/144 280/86.5 |
| 2004/0188968 A1 * | 9/2004 | Warner | | B62D 13/04 280/89.11 |
| 2015/0266507 A1 | 9/2015 | Westnedge et al. | | |

* cited by examiner

STEERING CENTERING/DAMPING MECHANISM FOR A STEERABLE HEAVY-DUTY VEHICLE AXLE/SUSPENSION SYSTEM

CROSS-REFERENCE TO RELATED APPLICATION

This application claims the benefit of U.S. Provisional Patent Application Ser. No. 62/403,863, filed Oct. 4, 2016.

BACKGROUND OF THE INVENTION

Technical Field

The invention relates generally to the art of heavy-duty vehicles. More particularly, the invention is directed to a steerable axle/suspension system for a heavy-duty vehicle. More specifically, the invention is directed to a steering centering/damping mechanism for a steerable axle/suspension system for a heavy-duty vehicle, which includes a mechanical steering centering/damping mechanism that provides a positive steering centering force at a zero steer angle to reduce wheel wobble at zero steer angle. The mechanical steering centering/damping mechanism also provides a steering centering force that increases with increasing steer angle, but with less force intensity at higher steer angles than prior art mechanical steering centering/damping mechanisms to decrease wheel slippage or tire scrubbing and increase tracking efficiency of the steerable axle suspension/system during vehicle turning. The combination of decreased wheel wobble and decreased tire scrubbing increases tire life and decreases vehicle maintenance costs. In addition, the steering centering/damping mechanism of the present invention includes reduced complexity, eliminates wear items and/or parts that can potentially fail, and provides improved packaging to allow the system to be more easily adapted to heavy-duty truck applications.

Background Art

Heavy-duty vehicles such as tractor-trailers and straight trucks typically include multiple axle/suspension systems that are longitudinally spaced along the vehicle to create ride stability. Federal Bridge Law directs that in order to transport the maximum load allowed, additional auxiliary axles are required at specified longitudinal spacing. Auxiliary axle/suspension systems may be non-liftable or liftable and steerable or non-steerable, depending on the specific application. Steerable axle/suspensions systems are well known in the art. It is also well known in the art that steerable axle/suspension systems are often capable of being lifted. Hence, for the purpose of simplicity, reference herein will be made to steerable axle/suspension systems with the understanding that steerable axle/suspension systems may optionally include a lift assembly.

The actual lifting of the lift axle is performed by the transversely-spaced suspension assemblies that are associated with the lift axle, with such steerable lift axle/suspension systems being well known in the art. The lift axle/suspension system typically is operated by a control system that is in turn actuated by a switch, commonly referred to as a lift switch, which is manually triggered by the operator of the vehicle. Lift switches traditionally have been installed in the cab of the vehicle for proximity to the operator. This prevents an operator from having to exit the cab, which can be particularly inconvenient in circumstances such as inclement weather.

In addition, the steerable axle/suspension system typically is located at about the center of the truck or trailer in the fore-aft direction and usually uses a single tire on each of the wheels at the axle ends. Such single tires each have a large area of contact with the ground. In a tight turning maneuver, the central positioning of the steerable axle/suspension system combines with the large area of contact of the tires and the severe angle between the tractor and the trailer, thereby causing the wheels of the steerable axle/suspension system to act as a pivot point.

When the vehicle is moving or operating in a reverse direction, the steerable axle/suspension system must be either lifted or locked into a straight position in order to allow for safe maneuvering of the vehicle. If the steerable axle/suspension system is lifted while operating in a reverse direction, then once the vehicle is again moved in a forward direction, the steerable axle/suspension system usually must be lowered back into contact with the ground surface. If the steerable axle/suspension system is locked into a straight position, or locked mode, while moving in a reverse direction, then once the vehicle is again moved or operated in a forward direction, the steerable axle/suspension system should be unlocked, or placed into a steering mode, so that it can once again steer as it is intended to do while moving in a forward direction.

Auxiliary steerable axle/suspension systems are generally self-steering. The wheels of such systems are forced to turn due to tracking forces imparted on the wheels by nature of the positioning of the steerable axle/suspension system relative to the tractor trailer during a vehicle turn, as well as each wheel's large area of contact with the road surface, and are not manually turned by a vehicle operator, as is known in the art. For purposes of the description contained herein, it is understood that the term "steerable axle/suspension system" will encompass "auxiliary self-steering axle/suspension systems." Because auxiliary steerable axle/suspension systems are typically self-steering, during a vehicle turn the wheels of the axle/suspension system may experience improper tracking, referring to instances when the wheels of the axle/suspension system do not return to a position perpendicular to the vehicle axle, or a zero steer angle, by the time the vehicle has completed a turn. If the wheels do not return to a zero steer angle by the time the vehicle has completed a turn, the wheels of the steerable axle/suspension system can be dragged by the tractor trailer, generally referred to as tire scrubbing in the art, and as a result experience excessive wear on the tires of the steerable axle/suspension system.

To minimize tire scrubbing of the wheels of a steerable/axle suspension system due to improper tracking during a vehicle turn, prior art steerable axle/suspension systems often include steering centering mechanisms which aid in returning the wheels to a position perpendicular to the vehicle axle, or zero steer angle, by the time a vehicle completes a turn and is once again moving in a forward direction. One such prior art mechanism utilizes a pair of oil filled stabilizer shocks including coil over springs that are each connected at one end to a respective arm extending from each steering knuckle, and are connected at a second end to a mounting point on the axle body toward the central longitudinal axis of each respective side of the axle/suspension system. For example, as the vehicle encounters a left turn, the coil over stabilizer shock attached to the steering knuckle arm of the steering assembly on the inside of the vehicle turn radius is compressed because the arm attached to the steering knuckle turns inward relative to the axle body of the axle/suspension system to which the second end of the stabilizer is attached. Conversely, the coil over stabilizer shock attached to the steering knuckle arm of the steering assembly on the outside of the vehicle turning radius is extended because the arm attached to the steering knuckle turns outward relative to the axle body of the axle/suspension system to which the second end of the stabilizer is attached. Because of the extension and compression of the coil over spring, both the extended stabilizer and the compressed stabilizer exhibit a positive steering centering force which increases with increasing steer angle, with equilibrium of the system being achieved when the wheels of the steerable axle/suspension system are at a zero steer angle, as is known in the art. While the coil over springs provide steering centering to the steerable axle/suspension system, the oil and valving internal to the stabilizer shocks serve to reduce inputs that can lead to wobble or shimmy of the steerable axle/suspension system during operation of the vehicle.

Although coil over stabilizer shocks provide adequate steering centering/damping during a vehicle turn, when the steerable axle/suspension system is near a straight alignment or zero steer angle, the centering forces imparted by the coil over springs of the stabilizer shocks on the driver side and curb side steering assembly of the axle/suspension system are very low due to the spring design. More specifically, when the shocks are installed on the axle/suspension system, they are installed in a compressed state, with each imparting a near equal outboard force on a respective driver side and passenger side steering knuckle arm Because each of the shocks imparts a near equal outboard force on its respective steering knuckle arm, the forces essentially cancel each other, resulting in a net centering force of about zero at a zero steer angle. As a result, coil over stabilizer shocks may experience some amount of wheel wobble or shimmy at the wheels attached to the auxiliary axle/suspension system near the zero turn angle due to the about zero centering force. This can result in uneven tire wear, increased wear on the steerable axle/suspension system, and increased vehicle maintenance, as is known in the art. Additionally, coil over stabilizer shocks are considered wear items and must be replaced at regular intervals, resulting in increased maintenance costs. Coil over stabilizer shocks also generally exhibit steering centering forces with undesirably high intensities at increased steer angles, which can decrease tracking efficiency during turns and increase the potential of tire scrubbing of the wheels of the axle/suspension system. In addition, the location of the coil over stabilizer shocks can potentially have adverse effects on suspension packaging or spacing as they are relatively large and two coil over stabilizer shocks are required for each steerable axle/suspension system.

Other prior art steering centering/damping mechanisms for steerable axle/suspension systems utilize a pneumatically controlled mechanism to constantly apply a steering centering force to each of the vehicle steering assemblies, referred to as pneumatic steering centering/damping mechanisms, and for purposes of the description contained herein, are not considered mechanically operative in nature. Such pneumatic steering centering/damping mechanisms typically employ an air spring that connects to a pair of locking arms which interface with a bracket clamped to the tie rod. The pressure inside the air spring applies a steering centering force through the tie rod equally to each connected steering assembly. As the steer angle of the steerable axle/suspension system is increased, the air spring is compressed which in turn increases the centering force. Steering centering/damping reaction forces associated with this type of mechanism can be adjusted to fit the steerable axle/suspension system application by adjusting the mechanism's operating air pressure.

Such systems can provide a positive steering centering force at a zero steer angle, thus minimizing the inputs that can lead to wheel wobble while the vehicle is traveling in a straight direction. However, these pneumatic steering centering/damping mechanisms include known potential failure modes that can affect their operation, which include: loss of air pressure due to a variety of component failures, wear of the air spring, and introduction of water, ice or other contaminants into the system thereby affecting performance. Additionally, the packaging of the air spring and its associated bracketry is quite large and can potentially limit its use to only trailer applications, where space is more available. In truck applications, where the steering centering/damping mechanism must accommodate the vehicle drive shaft, such pneumatic steering centering/damping mechanisms generally cannot be used.

Thus a need exists in the art for a mechanically operated steering centering/damping mechanism that provides a positive steering centering force while the steerable axle/suspension system is at zero steer angle, as well as an increasing steering centering force as the steer angle of the vehicle steering assemblies increase, but with less force intensity than prior art mechanical steering centering/damping mechanisms, to reduce wheel wobble at zero steer angle and decrease tire scrubbing and increase tracking efficiency of the steerable axle/suspension system. The steering centering/damping mechanism of the present invention satisfies these needs by employing a steering centering/damping mechanism which includes a preloaded spring assembly integrated into each steering assembly which applies a constant positive centering force on each steering assembly at zero steer angle to resist the effects of inputs that lead to suspension wheel wobble and shimmy, and also offers increasing steering centering force on the steering assemblies as the steer angle increases with less force intensity, which decreases tire scrubbing and increases the tracking efficiency of the steerable axle/suspension system during a vehicle turn. The combination of decreased wheel wobble and decreased tire scrubbing increases tire life and decreases vehicle maintenance costs. The steering centering/damping mechanism of the present invention also eliminates wear items, such as coil over stabilizer shocks, and/or parts that can potentially fail, such as those of pneumatic steering centering/damping mechanisms. Additional benefits include the ability to utilize the steering centering/damping mechanism of the present invention in truck applications where the drive shaft of the vehicle limits packaging space. Moreover, the steering centering/damping mechanism of the present invention can potentially reduce the required packaging envelope fore to aft as coil over shock absorbers are no longer required. The steering centering/damping mechanism of the present invention also includes reduced complexity, which reduces weight and cost over the more complicated and bulky pneumatic steering centering/damping mechanisms of the prior art utilized in trailer applications.

BRIEF SUMMARY OF THE INVENTION

An objective of the present invention includes providing a steering centering/damping mechanism with a positive steering centering force at a zero steer angle and also a steering centering force that increases with increasing steer angle with less force intensity than prior art mechanical steering centering/damping mechanisms.

Another objective of the present invention is to provide a steering centering/damping mechanism which reduces wheel wobble at zero steer angle of the steerable axle suspension/system.

Yet another objective of the present invention is to provide a steering centering/damping mechanism which decreases tire scrubbing with increasing steer angle to increase tracking efficiency of the steerable axle suspension/system during vehicle turning, which in turn increases tire life.

Yet another objective of the present invention is to provide a steering centering/damping mechanism which decreases vehicle maintenance costs.

Yet another objective of the present invention is to provide a steering centering/damping mechanism with reduced complexity and that eliminates parts that can potentially fail.

Yet another objective of the present invention is to provide a steering centering/damping mechanism with improved packaging that allows the system to be more easily adapted to heavy-duty truck applications.

These objectives and others are achieved by the steering centering/damping mechanism for a steerable heavy-duty vehicle axle/suspension system of the present invention, which includes a mechanically operated structure that provides a positive steering centering force to the axle/suspension system at about a zero steer angle and increasing positive steering centering force with increasing steer angle.

BRIEF DESCRIPTION OF THE SEVERAL VIEWS OF THE DRAWINGS

The preferred embodiment of the present invention, illustrative of the best mode in which Applicant has contemplated applying the principles of the present invention, is set forth in the following description and is shown in the drawings.

Similar numerals refer to similar parts throughout the drawings.

DETAILED DESCRIPTION OF THE INVENTION

Figure 1:
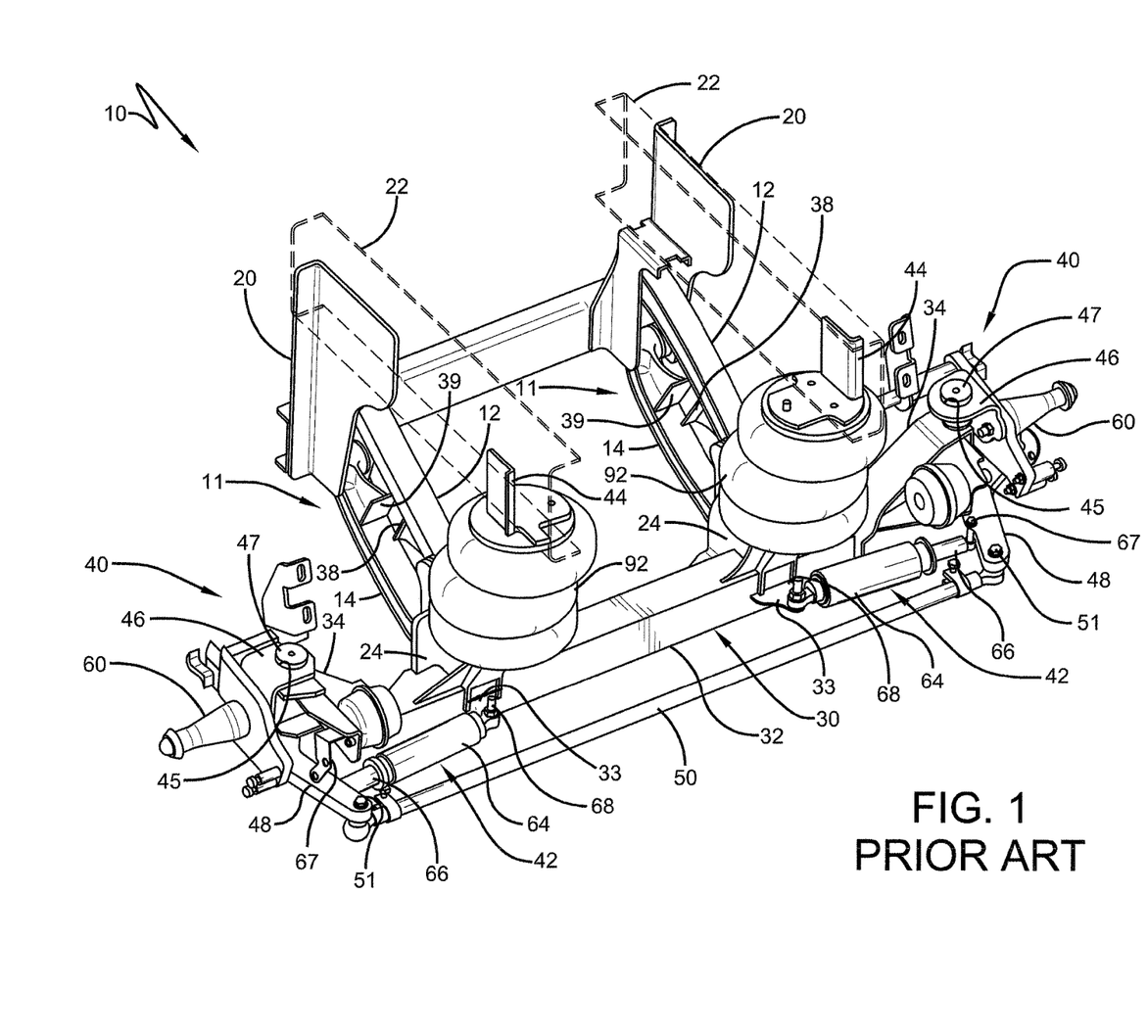
FIG. 1 is a driver side perspective view of a steerable axle/suspension system with the vehicle frame represented by dashed lines, showing the axle/suspension system utilizing a pair of prior art coil over stabilizer shock steering centering/damping mechanisms.

In order to better understand the steering centering/damping mechanism of the present invention and the environment in which it operates, an auxiliary steerable axle/suspension system, indicated generally at 10, incorporating a pair of prior art coil over stabilizer shocks 42, is shown in FIG. 1, and will now be described in detail below.

With continued reference to FIG. 1, auxiliary steerable axle/suspension system 10 is a self-steering auxiliary lift-axle type suspension system having a parallelogram, trailing arm geometry. Steerable axle/suspension system 10 typically is a relatively lightweight suspension, designed to permit compliance with any applicable bridge weight and stress regulations, such as the Federal Bridge Formula associated with the relevant laws and regulations applicable within the United States of America.

With continued reference to FIG. 1, steerable axle/suspension system 10 includes a pair of lift assemblies 11, a pair of hangers 20, a pair of ride air springs 92, an axle 30, a pair of steering assemblies 40, and prior art coil over stabilizer shocks 42.

With respect to steerable axle/suspension system 10, the majority of the components positioned on the driver side of the vehicle will have correspondingly similar components positioned on the curb side of the vehicle. Accordingly, in this description, when reference is made to a particular suspension component, it will be understood that a similar component is present on the opposite side of the vehicle, unless otherwise apparent.

Each lift assembly 11 includes a pair of upper and lower longitudinally extending parallel beams 12,14, respectively. Upper and lower beams 12,14 are spaced-apart and vertically aligned and are pivotally connected at their front ends by a pair of pivot bushing assemblies (not shown) to side rail frame hanger bracket 20 which, in turn, is rigidly attached to and depends from a respective one of a pair of transversely spaced-apart parallel longitudinally extending frame main members 22 of the heavy-duty vehicle. Upper and lower parallel beams 12,14 also are pivotally connected at their rearward ends to an air spring bracket 24 by pivot bushing assemblies (not shown). Air spring bracket 24 is mounted on laterally extending fabricated axle 30 having a hollow axle body 32, and gooseneck portions 34 extending outboardly on each end of the axle body. An inline lift air spring (not shown) is mounted to beams 12,14 via brackets 38,39, respectively. Vertical ride air spring 92 is mounted on air spring bracket 24 and is connected to frame member 22 through an upper air spring bracket 44 attached to the top of the air spring. As air from an air supply source (not shown) installed on the heavy-duty vehicle is introduced into each inline air spring (not shown), and air is simultaneously released from each vertical ride air spring 92, steerable axle/suspension system 10 is lifted in a manner known in the art.

To enable wheels (not shown) attached to steerable axle/suspension system 10 to turn, steering assembly 40 is attached outboardly of each gooseneck portion 34 located on each end of axle body 32, as is known in the art. Each steering assembly 40 includes a steering knuckle 46, a kingpin 47, and a spindle end 60. Gooseneck portion 34 of axle body 32 is formed with a vertically extending opening (not shown) near its outboard end. Steering knuckle 46 is generally C-shaped, and is formed with vertically aligned openings 45 on the top and bottom of the steering knuckle. Openings 45 of steering knuckle 46 are aligned with the opening (not shown) of gooseneck portion 34 of axle body 32, such that the gooseneck portion is situated between the top and bottom of the C-shaped steering knuckle. Kingpin 47 is disposed through vertical openings 45 of steering knuckle 46 and the vertical opening of gooseneck portion 34 of axle body 32 to pivotally connect the steering knuckle to the gooseneck portion. Steering knuckle 46 includes a steering arm 48 which extends rearwardly from the C-shaped portion of the knuckle. A tie rod 50 is attached to the rearward end of each steering arm 48 by pivot bolts 51, and extends transversely between the driver side and curb side steering arms, thereby linking each steering arm of each steering knuckle 46 mounted on the driver side and the curb side of the vehicle. Tie rod 50 provides pivotal movement synchronization of both the driver side and curb side steering knuckles 46 during a vehicle turn, as is known in the art. Spindle end 60, on which a wheel (not shown) is rotatably mounted, is rigidly attached to the outboard surface of steering knuckle 46.

Steerable axle/suspension system 10 employs a steering centering/damping mechanism that utilizes coil over stabilizer shocks 42 to provide steering centering and damping. Each coil over stabilizer shock 42 includes a plastic sheath 64 that surrounds a coil over spring (not shown). An oil filled piston body 66 and a piston shaft (not shown), which is disposed within and slidably engages the piston body, are disposed within the coil over spring. An internal valve (not shown) is attached to the outboard end of the piston shaft disposed within piston body 66. As set forth above, piston body 66 and the piston shaft are disposed through a spring (not shown) which is attached to the inboard end of shock 42 and which is also attached to piston body 66. A mounting bracket 33 is welded or otherwise rigidly attached to axle body 32 slightly inboard of gooseneck portion 34 of axle body 32. Stabilizer shock 42 is attached at one end to mounting bracket 33 via fastener 68, and the stabilizer shock is attached at its other end to steering arm 48 inboard of the attachment of tie rod 50 to the steering arm via fastener 67. As the piston shaft is compressed or retracted within piston body 66, the passing of oil between the variable valve (not shown) situated within the piston body results in a compressive force or rebound force, respectively, on the piston shaft resisting the movement of the shaft in the opposite direction of the respective compressive or rebound force, as is known in the art. Additionally, as the coil over stabilizer shock is compressed or extended, the spring attached to piston body 66 and the piston shaft is also compressed or extended, resulting in a spring force opposite in direction to the compression or extension to counteract the respective force to return the system to equilibrium. The combination of the spring force and fluid pressure forces experienced by each coil over stabilizer shock 42 provides steering centering and damping to axle/suspension system 10 during a vehicle turn, as will now be described with respect to a vehicle encountering a left turn.

Figure 2:
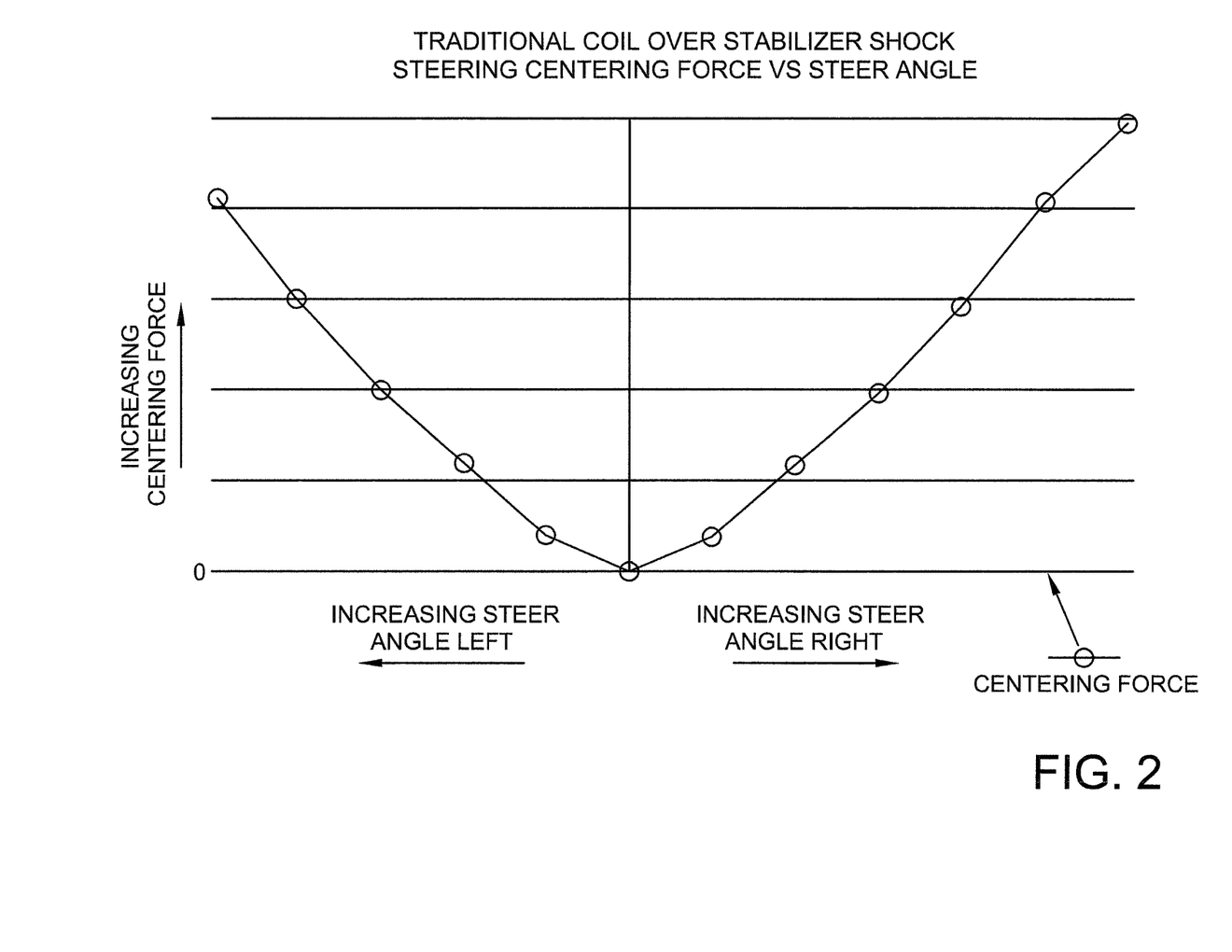
FIG. 2 is a graphical representation of the relationship between the steering centering force and the steer angle for the coil over stabilizer shock steering centering/damping mechanisms shown in FIG. 1.

As a heavy-duty vehicle utilizing steerable axle/suspension system 10 encounters a turn, due to tracking forces imparted on the wheels attached to the steerable axle/suspension system, as well as the pivotal synchronization of the driver side and curb side steering knuckles 46 by tie rod 50, both wheels (not shown) attached to the steerable axle/suspension system are forced to turn in the same direction, as is known in the art. As the driver side wheel (not shown) of steerable axle/suspension assembly 10 is turned left, the driver side coil over stabilizer shock 42 attached to the driver side steering knuckle 46 is increasingly compressed as the steering angle increases because steering arm 48 of the steering knuckle pivots counter-clockwise about kingpin 47, forcing inboard movement of the steering arm about the pivotal connection. Conversely, as the curb side wheel (not shown) of steerable axle/suspension system 10 is forced to turn left, the curb side coil over stabilizer shock 42 attached to the curb side steering knuckle 46 is increasingly extended as the steering angle increases because the curbside steering arm 48 of the steering knuckle also pivots counter-clockwise about kingpin 47, forcing outboard movement of the steering arm about the pivotal connection. With reference to FIG. 2, as the steering turn angle increases, the compression of the driver side coil over stabilizer shock 42 and the extension of the curb side coil over stabilizer shock 42 increases. Due to the compressive force and rebound forces on the driver side and curb side coil over stabilizer shock 42, respectively, both the extended stabilizer shock and the compressed stabilizer shock exhibit a positive steering centering force increasing with increasing steer angle, as is known in the art.

Although coil over stabilizer shocks 42 provide steering centering and damping during a vehicle turn, when the steerable axle/suspension system is in a straight alignment, and each steering assembly is at a zero steer angle, the centering forces imparted by the stabilizers on the driver side and curb side steering assemblies 40 of steerable axle/suspension system 10 are very low, resulting in an about zero centering force. Consequently, the wheels attached to steerable axle/suspension system 10 can potentially experience wheel wobble as the vehicle is traveling in a straight direction, which can result in uneven tire wear, increased wear on the steerable axle/suspension system, and increased required vehicle maintenance. Coil over stabilizer shocks 42 also generally experience undesirably high steering centering force intensities at increasing steer angles, which can increase the potential for tire scrubbing of the wheels of steerable axle/suspension system 10. Additionally, coil over stabilizer shocks 42 are relatively complex components and are considered wear items and must be replaced at regular intervals, resulting in increased maintenance costs. Also, the location of coil over stabilizer shocks 42 can potentially have adverse effects on suspension packaging in the fore-aft direction, as they are relatively large and two coil over stabilizer shocks are required for each steerable axle/suspension system 10.

Figure 3:
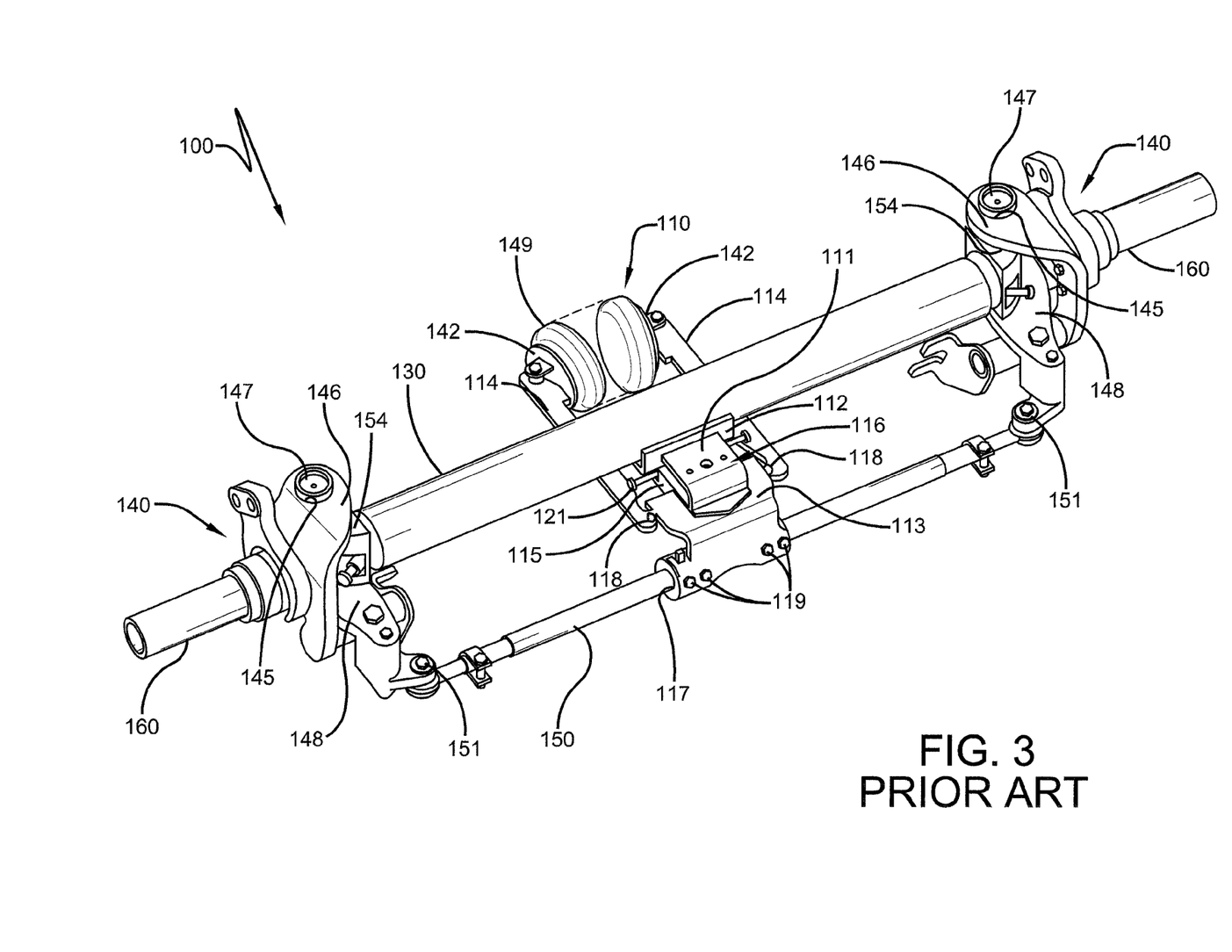
FIG. 3 is a driver side perspective view of portions of a steerable axle/suspension system, showing a pair of steering assemblies, each one mounted on a respective end of the axle of the axle/suspension system, and showing a prior art pneumatically controlled steering centering/damping mechanism mounted on the axle and operatively attached to a tie rod extending between the steering assemblies.

A prior art pneumatic steering centering/damping mechanism which is pneumatically controlled to constantly apply a steering centering force, is incorporated into a heavy-duty steerable axle/suspension system 100, is indicated generally at 110 and is shown in FIG. 3. Steerable axle/suspension system 100 generally includes a transversely extending central axle tube 130, and a pair of steering assemblies 140. Central axle tube 130 is supported by a pair of transversely-spaced trailing arm beams (not shown), which typically are welded or otherwise rigidly affixed to the central axle tube. Each trailing arm beam (not shown) is pivotally attached in a well-known fashion at its front end to a respective one of a pair of transversely-spaced frame hangers (not shown), which in turn are rigidly attached to and depend from the frame (not shown) of the vehicle. Steerable axle/suspension system 100 typically also includes a pair of air springs (not shown), each of which extends between and is mounted between a rear end of a respective beam (not shown) and a corresponding trailer frame main member (not shown), as is known in the art.

With respect to steerable axle/suspension system 100, the majority of the components positioned on the driver side of the vehicle will have correspondingly similar components positioned on the curb side of the vehicle. Accordingly, in this description, when reference is made to a particular suspension component, it will be understood that a similar component is present on the opposite side of the vehicle, unless otherwise apparent.

To enable wheels (not shown) attached to steerable axle/suspension system 100 to turn, each steering assembly 140 is attached to an outboard end of central axle tube 130 opposite one another, as is known in the art. Each steering assembly 140 includes a steering knuckle 146, a kingpin 147, a fixed arm 154, and a spindle end 160. Fixed arm 154 of steering assembly 140 is welded or otherwise rigidly attached to the outboard end of central axle tube 130. Fixed arm 154 is formed with a vertically extending opening (not shown) near its outboard end. Steering knuckle 146 is generally C-shaped, and is formed with vertically aligned openings 145 on the top and bottom of the steering knuckle. Steering knuckle openings 145 are aligned with the opening (not shown) of fixed arm 154, such that the fixed arm is situated between the top and bottom of the C-shaped steering knuckle. Kingpin 147 is disposed through vertical steering knuckle openings 145 and the vertical opening of fixed arm 154 to pivotally connect the steering knuckle to the fixed arm. Steering knuckle 146 includes a steering arm 148 which extends rearwardly from the C-shaped portion of the knuckle. Spindle end 160, on which a wheel (not shown) is rotatably mounted, is rigidly attached to the outboard surface of steering knuckle 146.

Steerable axle/suspension system 100 employs pneumatic steering centering/damping mechanism 110 to provide steering centering and damping to the steerable axle/suspension system during a vehicle turn. Pneumatic steering centering/damping mechanism 110 includes an axle mount bracket 112 fixedly attached generally to the bottom portion of central axle tube 130, via welds (not shown). Axle mount bracket 112 is generally U-shaped and extends along central axle tube 130. Axle mount bracket 112 is connected to a rearwardly-extending bracket 116 that includes a top portion 111 that is C-shaped with ends attached to the rear surface of axle mount bracket 112. Axle mount bracket 112 also is connected to a bottom portion 115 of rearwardly-extending bracket 116 and is parallel to top portion 111 and is spaced downwardly therefrom to form an opening facing generally rearwardly and includes features to pivotally attach lock arms 114. A stop bolt 121 is rigidly connected to axle mount bracket 112 and extends outboardly from both the driver side and curb side of the axle mount bracket. A tie rod mount 113 is located between top portion 111 and bottom portion 115 of bracket 116 so that it can freely move from side to side between the top and bottom portions. Tie rod mount 113 is formed with a pair of transversely spaced-apart lock arm contact points 118. A lock arm 114 is pivotally attached to each lock arm pivot (not shown). Each lock arm 114 extends longitudinally frontwardly underneath central axle tube 130 and is pivotally connected to the front end of mount bracket 112 (not shown). Each lock arm 114 provides for attachment of an air spring 149. Specifically, each lock arm 114 includes an air spring bracket 142 welded or otherwise attached to the front end of the lock arm. The driver-side air spring bracket 142 is fixedly attached to one end of an air spring 149 in a manner well known in the art. The curbside air spring bracket 142 is fixedly attached to the other end of air spring 149 in a manner well known in the art.

Tie rod mount 113 extends rearwardly and downwardly from its engagement between rearwardly-extending bracket top portion 111 and rearwardly-extending bracket bottom portion 115, and includes a transversely extending opening 117. A tie rod 150 is disposed within transversely extending opening 117 and is immovably secured within the transversely extending opening by a plurality of clamp fasteners 119. Each end of tie rod 150 is attached to the rearward end of a respective one of steering arms 148 by fasteners 151, and extends transversely between the driver side and curb side steering arms, thereby linking each steering arm 148 of each steering knuckle 146 mounted on the driver side and the curb side of the vehicle. Tie rod 150 provides pivotal movement synchronization of both the driver side and curb side steering knuckles 146 during a vehicle turn, as is known in the art. Because each lock arm 114 is pivotally attached to mount bracket 112 and in contact with each respective lock arm contact point 118 and stop bolt 121, as tie rod mount 113 is moved transversely between top portion 111 and bottom portion 115 of axle mount bracket rearwardly-extending bracket 116, the front end of each lock arm travels transversely opposite the travel direction of tie rod mount 113, while the rear end of each lock arm travels transversely with the tie rod mount. Because air spring 149 is attached to the front ends of each lock arm 114, which in turn are pivotally connected to tie rod mount 113, control of the air spring pressure enables pneumatically controlled steering centering/damping mechanism 110 to provide steering centering and damping to the steerable axle/suspension system during a vehicle turn, as will now be described.

As a heavy-duty vehicle utilizing steerable axle/suspension system 100 encounters a turn, due to tracking forces imparted on the wheels attached to the axle/suspension system, as well as the pivotal synchronization of the driver side and curb side steering knuckles 146 by tie rod 150, both wheels (not shown) attached to the axle/suspension system are forced to turn in the same direction, as is known in the art. Because air spring 149 is attached between the curb side and driver side air spring brackets 142, pneumatic steering centering/damping mechanism 110 provides adjustable steering centering/damping to steerable axle/suspension system 100 that is dependent upon the pressure of the air spring, and is applied equally to both the driver side and curb side steering assemblies 140. More specifically, as air is increasingly introduced into air spring 149, the pivotal movement of each lock arm 114 about its pivotal attachment to mount bracket 112 and lock arm contact point 118 is increasingly restricted, as is known in the art. Because tie rod 150 is attached to both the driver side and curb side steering assemblies 140 and is secured within tie rod mount 113, which in turn is pivotally connected to each lock arm 114, both the driver side and curb side steering assemblies 140 experience a constant steering centering force equal to the transverse movement resistance imparted on tie rod 150 by the set pressure of air spring 149. By increasing the internal pressure of air spring 149, the steering centering force imparted on steerable axle/suspension system 100 is increased. Conversely, by decreasing the internal pressure of air spring 149 the steering centering force imparted on steerable axle/suspension system 100 is decreased. Similarly, during a turn, as the tracking forces of the tires cause lock arms 114 to pivot, air spring 149 is compressed resulting in an increased pressure in the air spring and thus an increased centering force.

Figure 4:
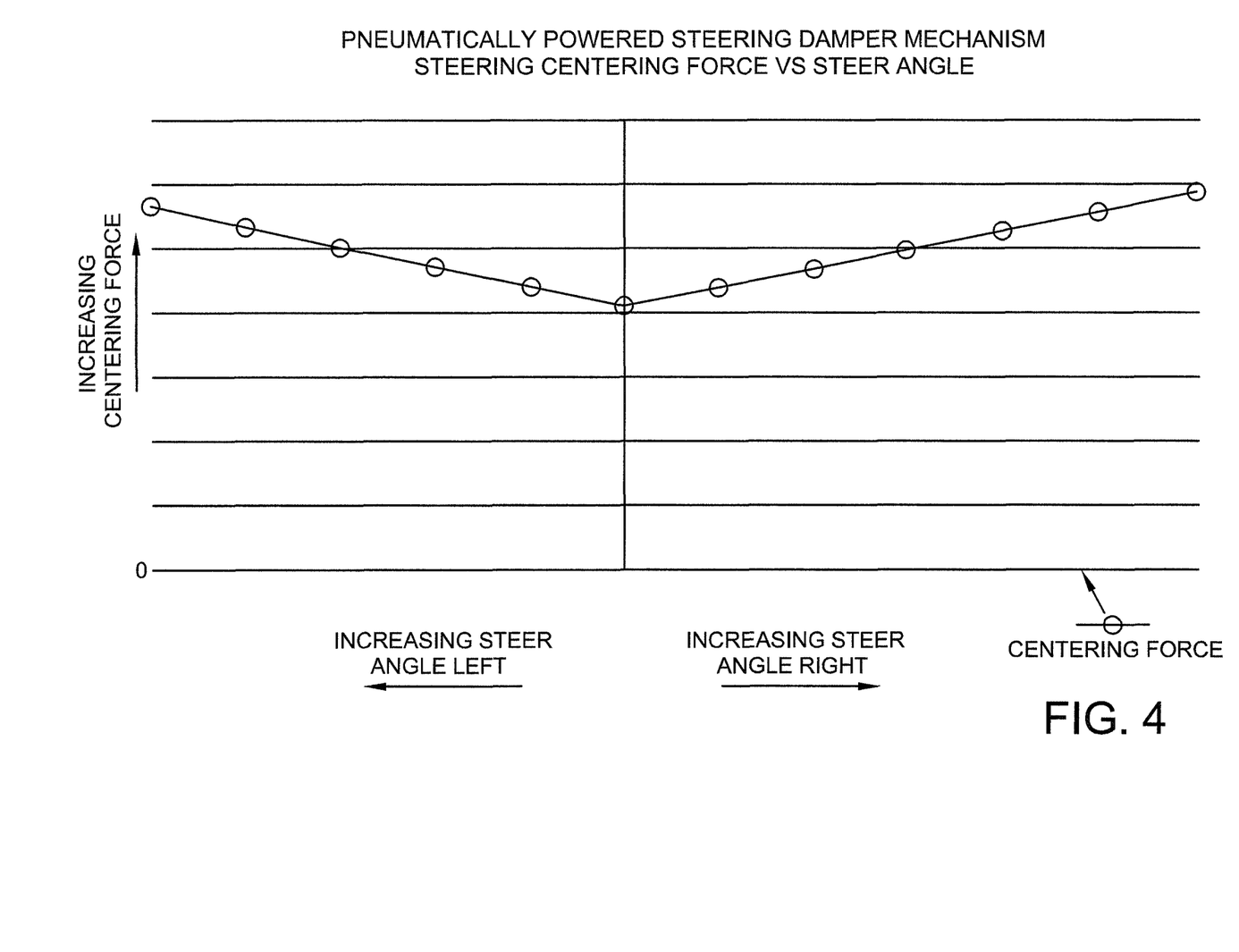
FIG. 4 is a graphical representation of the relationship between the steering centering force and the steer angle for the pneumatically controlled steering centering/damping mechanism shown in FIG. 3.

With particular reference to FIG. 4, pneumatic centering/damping mechanism 110 provides a positive steering centering force at a zero steer angle which is constant in relation to the set pressure of air spring 149. The steering centering force imparted on each steering assembly 140 increases with increasing steer angle of the steering assemblies because, as set forth above, during a vehicle turn the pressure of compressed air spring 149 increases. Pneumatic centering/damping mechanism 110 can provide a positive steering centering force to steerable axle/suspension 100 at a zero steer angle, thus minimizing wheel wobble while the vehicle is traveling in a straight direction, and increasing wheel tracking efficiency beyond the constant resistance achieved by the set air spring operating pressure. However, pneumatic steering centering/damping mechanism 110 potentially exhibits known failure modes that can affect its operation, which may include: loss of air pressure due to a variety of component failures, wear of the air spring, introduction of water, ice or other contaminants into the system thereby affecting performance. Additionally, the packaging of air spring 149 and its associated bracketry is quite large and can potentially limit its use to only trailer applications, where space is more available. In truck applications, where the vehicle drive shaft is centered longitudinally under the vehicle, pneumatic steering centering/damping mechanism 110 cannot be used due to space constraints.

Therefore, a need exists in the art for a mechanically operated steering centering/damping mechanism for a heavy-duty steerable axle/suspension system that provides a positive steering centering force while the wheels of the axle/suspension system are at zero angle, and also provides increasing positive steering centering force as the steer angle of the wheels increase with less force intensity at higher steer angles than prior art mechanical steering centering/damping mechanisms, thereby minimizing wheel wobble at zero steer angle and minimizing tire scrubbing of the wheels of the steerable axle/suspension system at increasing steer angles to improve wheel tracking efficiency during vehicle turning. There is also a need in the art for a steering centering/damping mechanism with decreased complexity and that eliminates wear items and/or parts that can potentially fail, minimizes maintenance costs, as well as provides improved packaging to allow the system to be more easily adapted to heavy-duty truck applications. The preferred embodiment steering centering/damping mechanism for heavy-duty vehicles of the present invention satisfies those needs, as will be described below.

Figure 5:
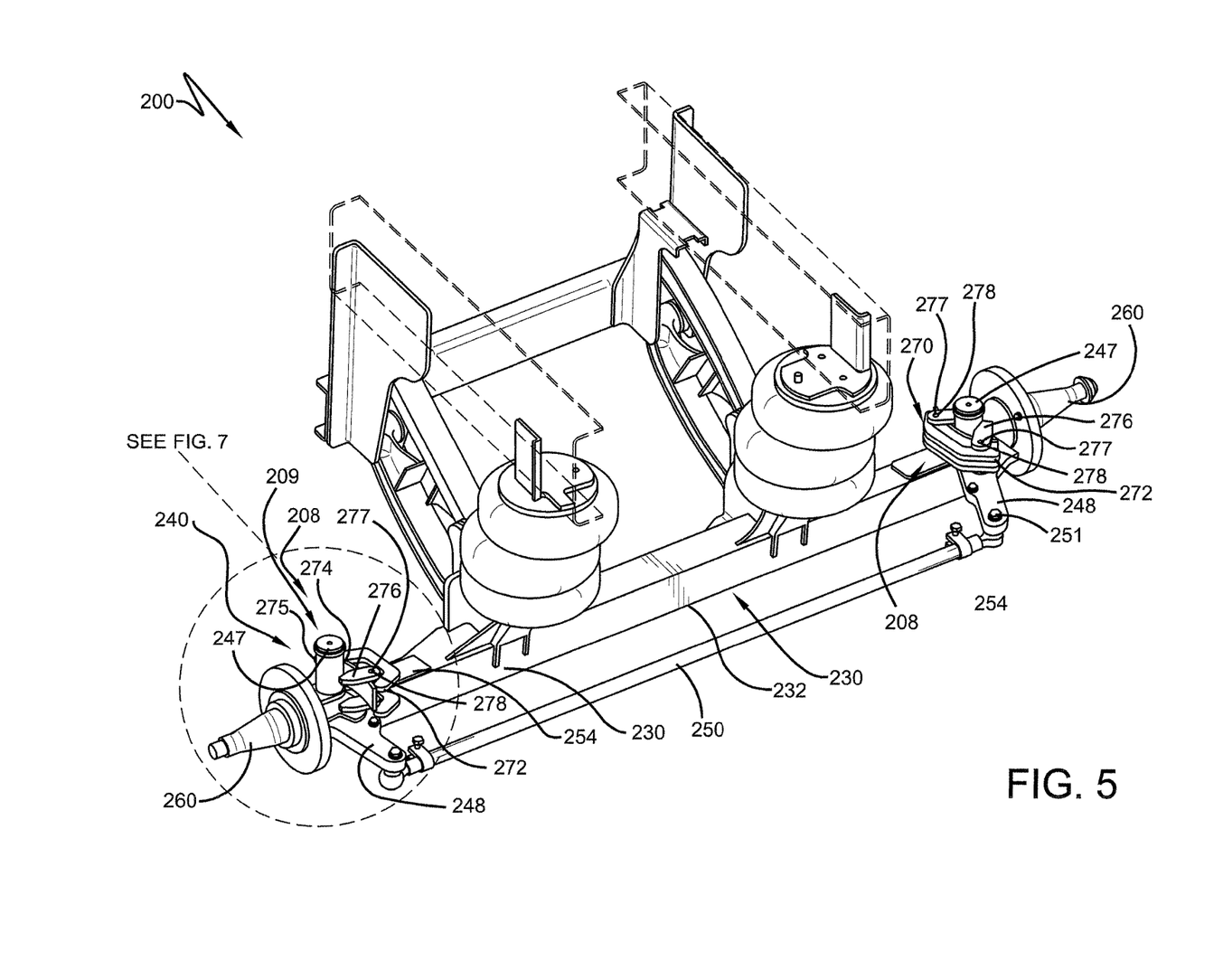
FIG. 5 is a driver side perspective view of a steerable axle/suspension system with the vehicle frame represented by dashed lines, showing the axle/suspension system utilizing a preferred embodiment steering centering/damping mechanism of the present invention.

A preferred embodiment steering centering/damping mechanism of the present invention incorporated into a heavy-duty steerable axle/suspension system 200 is shown in FIG. 5 and is indicated generally at 208. Steerable axle/suspension system 200 is similar in structure and function to that of steerable axle/suspension system 10 previously described, except that steerable axle/suspension system 200 includes preferred embodiment steering centering/damping mechanism 208 of the present invention and eliminates coil over shocks 42. As a result, only the differences between steerable axle/suspension 200 and steerable axle/suspension system 10—which will help explain preferred embodiment steering centering/damping mechanism 208 of the present invention will be described below.

With respect to steerable axle/suspension system 200, the majority of the components positioned on the driver side of the vehicle will have correspondingly similar components positioned on the curb side of the vehicle. Accordingly, in this description, when reference is made to a particular suspension component, it will be understood that a similar component is present on the opposite side of the vehicle, unless otherwise apparent.

Figures 7, 8:
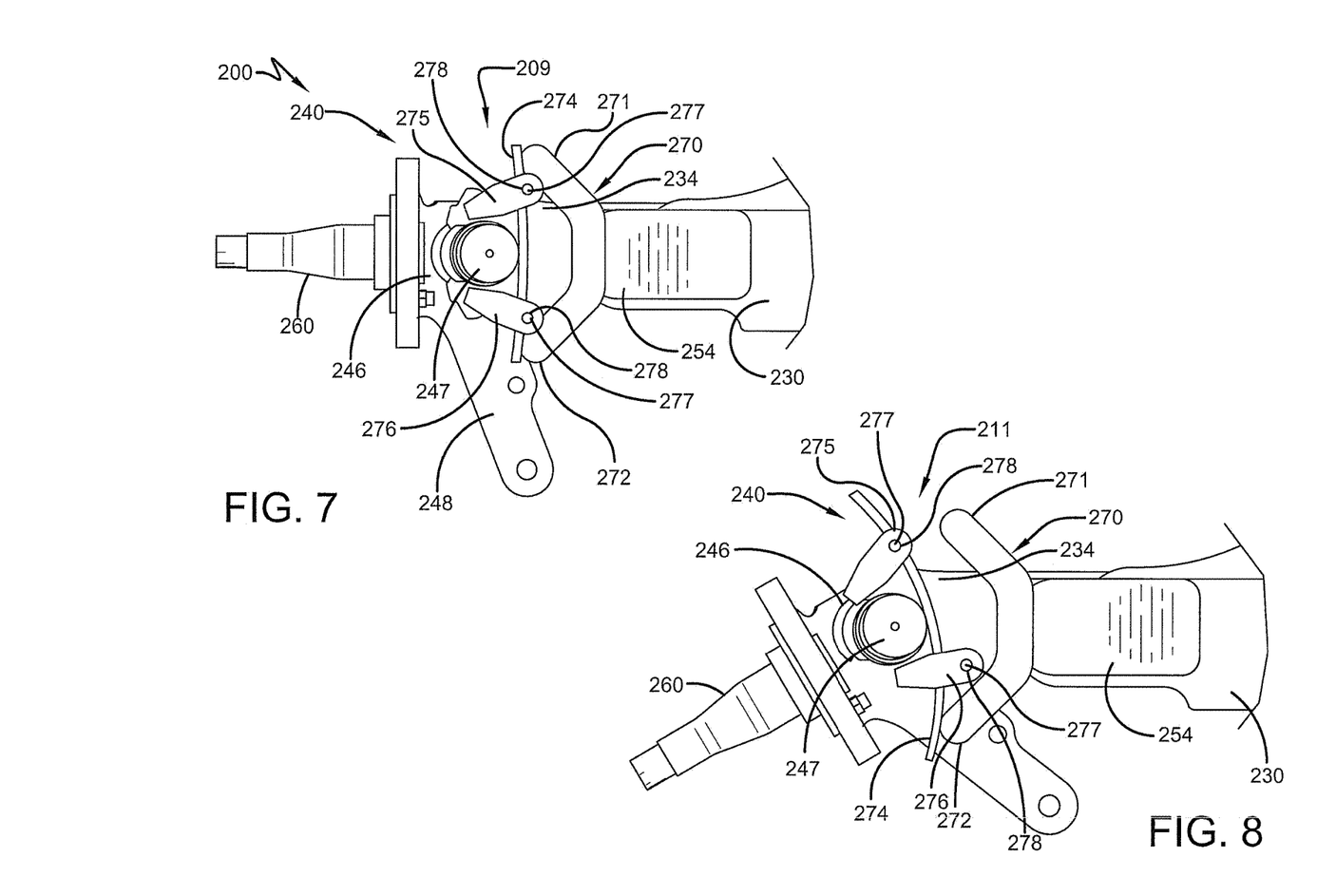
FIG. 7 is a greatly enlarged fragmentary top plan view of the circled driver side portion of the steerable axle/suspension system shown in FIG. 5 marked "See FIG. 7"
FIG. 8 is a view similar to FIG. 7, showing the driver side steering assembly and integrated spring assembly during a left turn.

With continued reference to FIG. 5, steerable axle/suspension system 200 generally includes a transversely extending central axle tube 230 and a pair of steering assemblies 240. To enable wheels (not shown) attached to steerable axle/suspension system 200 to turn, steering assembly 240 is attached outboardly of respective ones of a gooseneck portion 234 located on each end of axle body 232. Each steering assembly 240 includes a steering knuckle 246, a kingpin 247, and a spindle end 260. Gooseneck portion 234 of axle body 232 is formed with a vertically extending opening (not shown) near its outboard end. Steering knuckle 246 is generally C-shaped, and is formed with vertically aligned openings 245 on the top and bottom of the steering knuckle. Openings 245 of steering knuckle 246 are aligned with the opening (not shown) of gooseneck portion 234 of axle body 232, such that the gooseneck portion is situated between the top and bottom of the C-shaped steering knuckle. Kingpin 247 is disposed through vertical openings 245 of steering knuckle 246 and the vertical opening of gooseneck portion 234 of axle body 232 to pivotally connect the steering knuckle to the gooseneck portion. Steering knuckle 246 includes a steering arm 248 which extends rearwardly from the C-shaped portion of the knuckle. A tie rod 250 is attached to the rearward end of each steering arm 248 by pivot bolts 251, and extends transversely between the driver side and curb side steering arms, thereby linking each steering arm of each steering knuckle 246 mounted on the driver side and the curb side of the vehicle. Tie rod 250 provides pivotal movement synchronization of both the driver side and curb side steering knuckles 246 during a vehicle turn, as is known in the art. Spindle end 260, on which a wheel (not shown) is rotatably mounted, is rigidly attached to the outboard surface of steering knuckle 246. In accordance with an important feature of the preferred embodiment steering centering/damping mechanism of the present invention, steering centering/damping mechanism 208 includes a spring assembly 209 integrated into each steering assembly 240, as is shown in FIGS. 5, 7, and 8. Spring assembly 209 includes a spring resistance axle bracket 270. Spring resistance axle bracket 270 is formed of a sturdy material, such as steel, and is generally horizontally C-shaped in the outboard direction. Spring resistance axle bracket 270 is circumferentially disposed around the inboard end of a steering assembly fixed arm 254, such that the open end of the C-shape is facing outboardly. Spring resistance axle bracket 270 is welded or otherwise rigidly attached to fixed arm 254. Spring resistance axle bracket 270 is formed with a front end 271 and a rear end 272. Front end 271 and rear end 272 extend outboardly frontwardly and outboardly rearwardly from fixed arm 254, respectively, and provide a positive stopping point for a flat or planar spring 274 of spring assembly 209, which will be described in greater detail below.

With particular reference to FIGS. 5 and 7, spring assembly 209 additionally includes a front spring mounting bracket 275 and rear spring mounting bracket 276. Each spring mounting bracket 275,276 is generally C-shaped and is formed of a sturdy material, such as metal. Spring mounting brackets 275,276 are rigidly attached to the top surface of steering knuckle 246 and are longitudinally spaced on opposite sides of king pin 247. Spring mounting brackets 275,276 extend inboardly from their respective attachment to steering knuckle 246. The inboard end of each mounting bracket 275,276 is formed with a pair of vertically aligned openings 277 (only one shown) slightly inboardly of king pin 247. A spring mounting pin 278 is disposed through each opening 277 and is welded or otherwise rigidly secured within the opening.

Flat spring 274 is longitudinally disposed between the inboard surface of king pin 247, the outboard surface of spring mounting pins 278, and the outboard surface of front end 271 and rear end 272 of spring resistance axle bracket 270 in a pre-loaded condition. Flat spring 274 includes a mechanically operated structure formed from material capable of elastic deformation, such as spring steel. For purposes of the description herein, it is to be understood that a "mechanically operated structure" excludes pneumatic structures, such as components of prior art pneumatic centering/damping mechanism 110.

Figure 6:
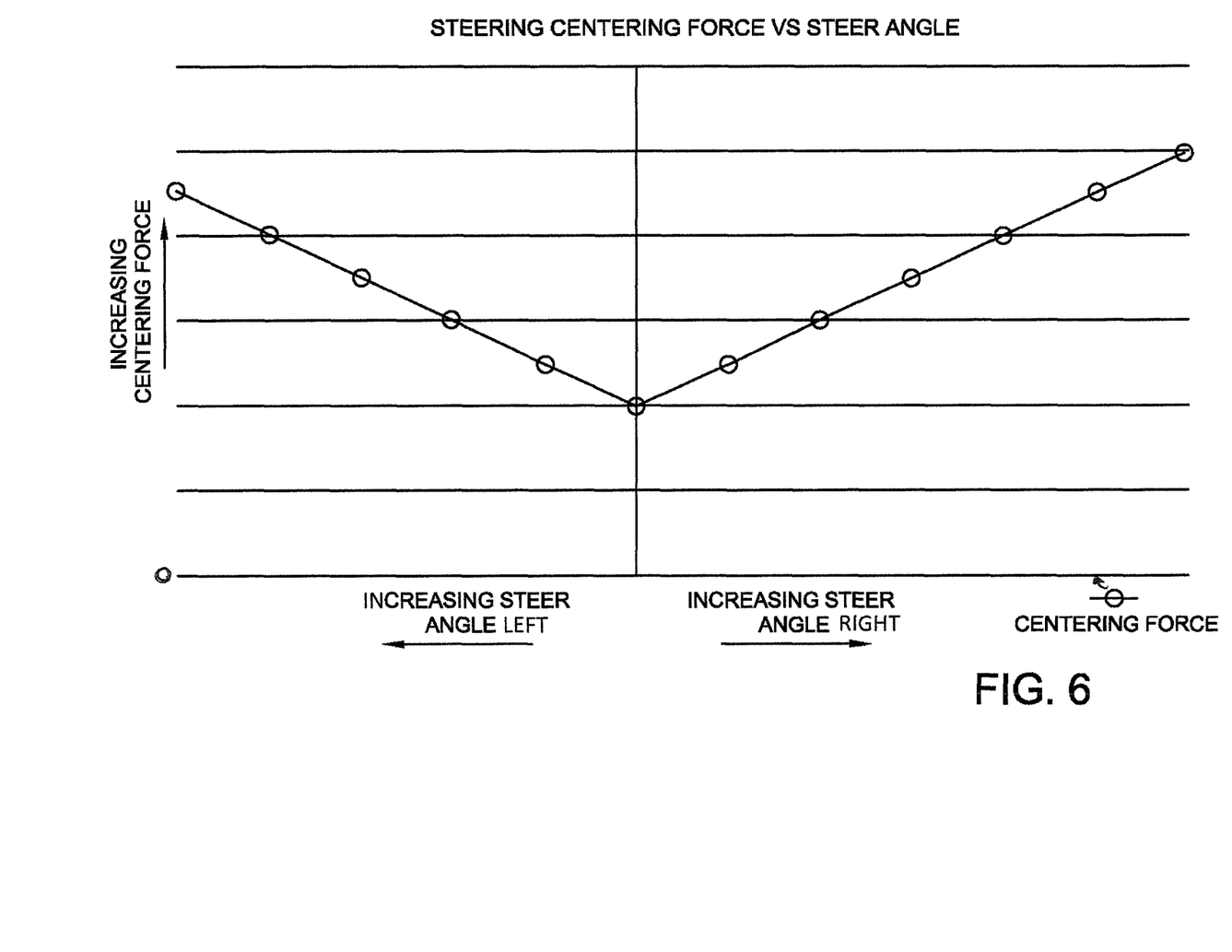
FIG. 6 is a graphical representation of the relationship between the steering centering force and the steer angle for the preferred embodiment steering centering/damping mechanism of the present invention shown in FIG. 5.

With particular reference to FIG. 7, when steering assembly 240 is at a zero steer angle, flat spring 274 contacts the inboard surface of king pin 247, and the outboard surfaces of spring mounting pins 278, and front and rear ends 271,272 of spring resistance axle bracket 270 to constantly impart a positive centering force to the steering assembly. As a heavy-duty vehicle utilizing steerable axle/suspension system 200 encounters a turn, due to tracking forces imparted on the wheels attached to the axle/suspension system, as well as the pivotal synchronization of the driver side and curb side steering knuckles 246 by tie rod 250, both wheels (not shown) attached to the axle/suspension system are forced to turn in the same direction. With particular reference to FIG. 8, as a heavy-duty vehicle utilizing axle/suspension assembly 200 experiences a forward left turn, the driver side steering knuckle 246 pivots counter-clockwise about its pivotal connection to king pin 247. Because flat spring 274 is disposed between spring mounting pin 277 of spring mounting bracket 275 and king pin 247, as the steer angle of driver side steering assembly 240 increases, the front end of the flat spring is pulled outwardly by the mounting pin, and is elastically deformed around the inboard perimeter of the king pin, while the rearward end of flat spring 274 is forced against and is positively stopped by the outboard edge of rear end 272 of spring resistance axle bracket 270. The elastic deformation of flat spring 274 around king pin 247 results in a centering or inboard directed spring force, with equilibrium of the system achieved by steering assembly 240 returning to a zero steer angle. With particular reference to FIG. 6, as the steer angle of steering assembly 240 increases, the inboard force or steering centering force of spring assembly 209 also increases as the front end of flat spring 274 is increasingly elastically deformed around king pin 247.

During a left hand turn, the curb side steering knuckle 246 also pivots counter-clockwise about its pivotal connection to king pin 247 causing a similar increase in steering centering force of the driver side spring assembly 209, except that as the steer angle of curb side steering assembly 240 increases, the rearward end of the curb side flat spring 274 is pulled outboardly by spring mounting pin 277 of rear spring mounting bracket 276, and is elastically deformed, around the inboard perimeter of the curb side king pin 247, while the front end of the flat spring is forced against and is positively stopped by the outboard edge of the curb side front end 271 of the curb side spring resistance axle bracket 270. With particular reference to FIG. 6, when a vehicle with steerable axle/suspension system 200 encounters a left turn or a right turn, both driver side and curb side spring assemblies 209 of preferred embodiment steering centering/damping mechanism 208 provide steering centering force to each respective steering assembly 240 which increases with increasing steer angle.

Preferred embodiment steering centering/damping mechanism 208 of the present invention provides heavy-duty steerable axle/suspension system 200 with a positive steering centering force on each steering assembly 240 at a zero steer angle, which reduces wheel wobble while the vehicle is traveling in a forward straight direction, as well as a steering centering force that increases with increasing steer angle with less force intensity at higher steer angles that prior art mechanical steering centering/damping mechanisms, which decreases the potential for tire scrubbing and increases the tracking efficiency of the steerable axle/suspension system during a vehicle turn. By minimizing tire scrubbing and wheel wobble, preferred embodiment steering centering/damping mechanism 208 of the present invention reduces vehicle maintenance costs by increasing tire life and decreasing wear to components of the axle/suspension system as a result of wheel wobble and inefficient wheel tracking. Preferred embodiment steering centering/damping mechanism 208 also eliminates the need for complex and consumable centering/damping mechanisms, such as coil over stabilizer springs. Additional benefits of the present invention include the ability to utilize steering centering/damping mechanism 208 of the present invention in truck applications where the drive shaft of the vehicle limits packaging space. Moreover, steering centering/damping mechanism 208 of the present invention can potentially reduce the required packaging envelope fore to aft as coil over shock absorbers are no longer required. Steering centering/damping mechanism 208 of the present invention also reduces weight and cost over the more complicated and bulky pneumatic steering centering/damping mechanisms of the prior art utilized in trailer applications.

Preferred embodiment steering centering/damping mechanism 208 of the present invention can be utilized in vocational truck applications as well as trailer applications.

Preferred embodiment steering centering/damping mechanism 208 of the present invention reduces complexity and eliminates potential failure modes of pneumatically controlled devices, which can potentially include loss of air pressure due to a variety of component failures, wear of the air spring, introduction of water, ice or other contaminants into the system thereby affecting performance.

It is to be understood that the structure and arrangements of the above-described preferred embodiment steering centering/damping mechanism 208 for heavy-duty vehicles of the present invention may be altered or rearranged without affecting the overall concept or operation of the invention. In addition, the steering centering/damping mechanism for heavy-duty vehicles of the present invention may be employed with other types of axles, wheel end assemblies and axle/suspension systems than those shown and described above, such as trailing and leading arm axle/suspension systems, and liftable and non-liftable axle/suspension systems, without affecting the overall concept or operation of the invention. It is further understood that preferred embodiment steering centering/damping mechanism 208 of the present invention could be automated or manually operated without changing the overall concept or operation of the present invention. It is even further understood that different shapes, materials and sizes could be utilized for the components of preferred embodiment steering centering/damping mechanism 208 of the present invention without changing the overall concept or operation of the present invention. It is even further contemplated that preferred embodiment steering centering/damping mechanism 208 could utilize mechanically operated structures different from those shown and described above to provide a positive steering centering force at a zero steer angle and a steering centering force that increases with increasing steer angle with less force intensity at higher steer angles that prior art mechanical steering centering/damping mechanisms, without affecting the overall concept or operation of the present invention. Moreover, while reference herein has been made generally to heavy-duty vehicles for the purpose of convenience, it has been with the understanding that such reference includes trucks, tractor-trailers, semi-trailers, and trailers thereof.

Accordingly, the steering centering/damping mechanism is simplified, provides an effective, safe, inexpensive and efficient structure which achieves all the enumerated objectives, provides for eliminating difficulties encountered with prior art steering centering/damping mechanisms, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the present invention has been described with reference to a specific embodiment. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the steering centering/damping mechanism for steerable heavy-duty vehicle axle/suspension systems of the present invention is used and installed, the characteristics of the construction, arrangement and method steps, and the advantageous, new and useful results obtained; the new and useful structures, devices, elements, arrangements, processes, parts and combinations are set forth in the appended claims.

What is claimed is:

1. A steering centering/damping mechanism for a steerable heavy-duty vehicle axle/suspension system comprising:
   a mechanically operated structure which provides a positive steering centering force to said axle/suspension system at about a zero steer angle, said mechanically operated structure providing increasing positive steering centering force with increasing steer angle of the axle/suspension system, wherein said mechanically operated structure is at least one flat spring; and
   at least one axle bracket attached to an axle of said axle/suspension system, said at least one axle bracket providing a positive stopping point for said at least one flat spring to provide said positive centering steering force at about said zero steer angle and said increasing positive centering force with increasing steer angle of said axle/suspension system.

2. The steering centering/damping mechanism for a steerable heavy-duty vehicle axle/suspension system of claim 1, wherein said mechanically operated structure is integrated into at least one steering assembly of said axle/suspension system.

3. The steering centering/damping mechanism for a steerable heavy-duty vehicle axle/suspension system of claim 1, wherein said mechanically operated structure is formed of an elastically deformable material.

4. The steering centering/damping mechanism for a steerable heavy-duty vehicle axle/suspension system of claim 1, wherein said flat spring is in a pre-loaded condition at a zero steer angle to provide said positive steering centering force at about said zero steer angle.

5. The steering centering/damping mechanism for a steerable heavy-duty vehicle axle/suspension system of claim 1, wherein said flat spring is formed of spring steel.

6. The steering centering/damping mechanism for a steerable heavy-duty vehicle axle/suspension system of claim 1, wherein said flat spring is disposed between a pair of brackets attached to a steering knuckle of said axle/suspension system, said brackets causing said flat spring to elastically deform to provide the increasing positive steering centering force with increasing steer angle during tracking of said axle/suspension system.

7. The steering centering/damping mechanism for a steerable heavy-duty vehicle axle/suspension system of claim 6, wherein said flat spring is elastically deformed around a king pin of a steering knuckle of said axle/suspension system.

8. The steering centering/damping mechanism for a steerable heavy-duty vehicle axle/suspension system of claim 7, wherein said flat spring is disposed between said king pin and said pair of brackets so that the flat spring is in a pre-loaded condition to provide said positive steering centering force at said zero steer angle.

9. The steering centering/damping mechanism for a steerable heavy-duty vehicle axle/suspension system of claim 6, wherein each one of said pair of brackets is C-shaped.

\* \* \* \* \*